J. G. FUNK.
VEHICLE TIRE.
APPLICATION FILED SEPT. 27, 1910.
988,997.
Patented Apr. 11, 1911.
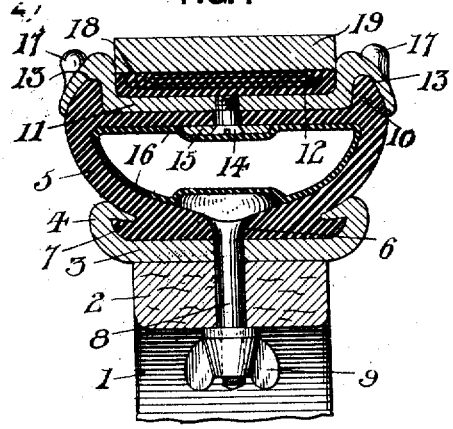
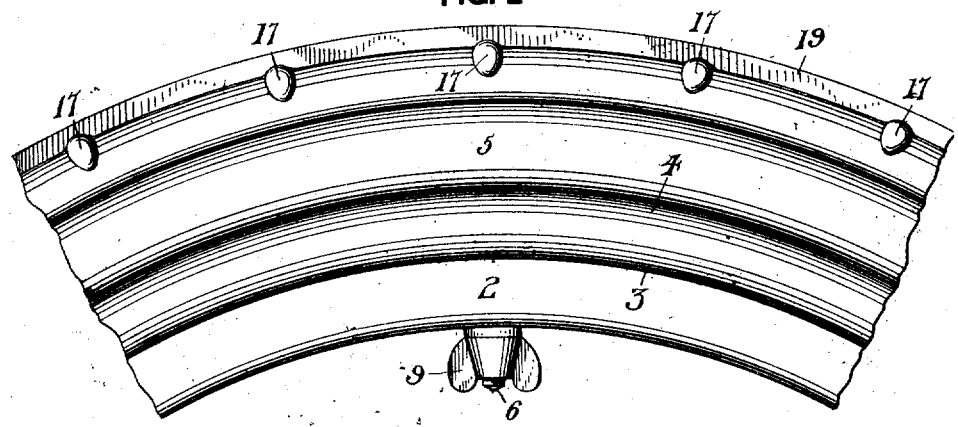
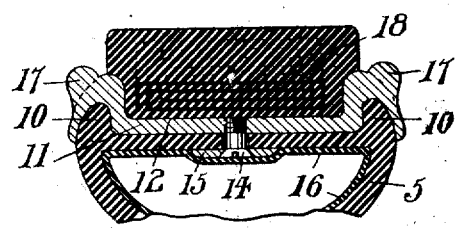

UNITED STATES PATENT OFFICE.

JOHN G. FUNK, OF SWISSVALE, PENNSYLVANIA.

VEHICLE-TIRE.

988,997.  Specification of Letters Patent.  Patented Apr. 11, 1911.

Application filed September 27, 1910. Serial No. 584,042.

*To all whom it may concern:*

Be it known that I, JOHN G. FUNK, a citizen of the United States, and residing in the borough of Swissvale, in the county of Allegheny and State of Pennsylvania, have invented or discovered new and useful Improvements in Vehicle-Tires, of which the following is a specification.

My invention consists in a new and improved tire for automobiles and other vehicles.

Generally speaking the tire consists of an inner rim removably attached to the felly of the wheel, a pneumatic tire of novel construction removably mounted on said inner rim, an outer rim removably mounted on said pneumatic tire, and a tread portion secured to the outer surface of said outer rim. Novel construction is shown in the attachment of the inner rim to the felly and of the various parts of the tire structure to one another. I provide the outer rim with a series of laterally extending studs or projections which by contact prevent skidding, add to the tractive effect and assist in crossing or mounting car-tracks and other irregularities in the path of the vehicle.

In the accompanying drawings, Figure 1 is a vertical section of the felly of a wheel provided with my improved tire; Fig. 2 is a segment of the same in side elevation, and Fig. 3 is a broken view similar to Fig. 1 but showing a modification of the tread.

The following is a detailed description of the drawings.

1 represents one of the spokes of a vehicle wheel and 2 the felly. 3 is a metal rim mounted on said felly and secured thereto by means to be described. The edges of the rim 3 are turned up to form clenchers 4—4.

5 is a shoe or casing of a pneumatic tire which may be made of the material usually employed for that purpose, such as vulcanized fiber. The shoe 5 is inclosed having an annular opening or slot 6 in its inner wall for the introduction of the inner tube and the attachment of the shoe to the inner rim. The lateral edges of the inner face of the tire are formed as annular lips 7—7 which engage the clenchers 4—4 of the rim 3. The shoe is removably secured in place on rim 3 by means of a series of bolts 8 whose rounded heads engage the interior walls of the shoe 5 and whose shanks extend through the slot 6 in said shoe and also through registering holes in the rim 3 and the felly 2. By means of thumb nuts 9 these bolts 8 may be tightened to hold the rim 3 and shoe 5 securely in place on the felly 2 but at the same time the shoe may be readily removed from the wheel. The bolts 8 are provided at suitable intervals around the felly. The outer face of the shoe 5 is flat except at the edges which are formed as outwardly extending lips 10—10.

11 is the metal outer rim provided with a flat inner face to abut against the face of shoe 5 but having its edges extending outwardly to form a channel or seat 12 for the tread, and then laterally and inwardly to form seats 13—13 for the lips 10—10 of the shoe 5.

14 represents one of a series of set screws whose heads are contained in countersunk washers 15 in the interior of the shoe 5 and which extend through the wall of shoe 5 and engage threaded holes in the web of rim 11.

It is evident that the outer rim may be readily detached from the shoe 5 when desired.

16 is the inner tube, seated in shoe 5 and adapted to be inflated in the usual manner.

17—17 represent a series of projections on the outer rim 11 which serve to engage the roadway in soft or muddy places and prevent skidding and increase the tractive force. They also assist the wheel in climbing obstructions and in turning in or out of car tracks.

The outer tread, carried by outer rim 11, is composed of cushion base 18, preferably made up of folded or layer fabric vulcanized together, and a tread portion proper which may be constructed in various manners. In Fig. 1 I have shown the same consisting of a ring of copper or other metal, 19, seated in channel 12, and superimposed on cushion 18, while in Fig. 3 I have shown the tread portion proper composed of solid rubber attached to the cushion. Among the metals I prefer copper as its softness and ductility adds to its tractive power and seats it more firmly in the channel 12. Its use is attended with but very little noise compared to steel or iron treads.

It will be observed that not only may my tire structure be readily assembled together and as readily dis-assembled, but that the structure as a whole may be readily removed from the wheel and another tire structure substituted with as little delay and trouble as attends the removal of the shoe of an ordinary pneumatic tire and the change of an inner tube. The tread will outwear the shoe of an ordinary rubber tire many times over and may be renewed at slight expense when necessary. The shoe 5 and tube 16 of my structure are protected, because of their location, from the ordinary danger of puncture and blow out. In case of collapse of the tube 16 no accident will result as my tire structure will not wholly collapse, as would an ordinary pneumatic tire but the wheel may be used as before without danger of accident or injury to the tire.

It is evident that the inner rim which I have illustrated is substantially identical to the usual form of clencher rim in ordinary use, so that my pneumatic tire, outer rim and tread may be mounted as a whole upon the rim of an ordinary vehicle wheel.

What I desire to claim is:—

1. In a vehicle tire, the combination of an inner rim detachably attachable to the felly, an inclosed shoe provided with an annular opening along its inner periphery, said shoe having a flat outer face with annular radial projections along its lateral edges, an outer rim adapted to be mounted on said flat face and having annular seats for said radial projections, and a tread secured to said outer rim, substantially as described.

2. In a vehicle tire, the combination of an inner rim detachably attachable to the felly, an inclosed shoe, of flattened triangular cross-section and having a flat outer face provided with annular radial projections along its lateral edges, mounted on said inner rim, an outer rim adapted to be mounted on said flat face and having annular seats for said radial projections, screws extending through the wall of said shoe and engaging threaded holes in said outer rim, and an outer tread mounted on said outer rim, substantially as described.

Signed at Pittsburg, Pa., this 21st day of September, 1910.

JOHN G. FUNK.

Witnesses:
 EDWARD A. LAWRENCE,
 A. W. FORSYTH.